(12) United States Patent
Shimomura et al.

(10) Patent No.: US 6,390,685 B1
(45) Date of Patent: May 21, 2002

(54) ROLLER BEARING

(75) Inventors: Yuuji Shimomura; Shinichi Natsumeda, both of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/653,348

(22) Filed: Aug. 31, 2000

(30) Foreign Application Priority Data

Aug. 31, 1999 (JP) ............................................. 11-246425

(51) Int. Cl.$^7$ ................................................. F16C 33/36
(52) U.S. Cl. ........................................ 384/568; 384/450
(58) Field of Search .................................. 384/450, 568

(56) References Cited

U.S. PATENT DOCUMENTS

| | | | | |
|---|---|---|---|---|
| 4,227,754 A | * | 10/1980 | Kellstrom | 384/450 |
| 4,557,613 A | * | 12/1985 | Tallian et al. | 384/568 |
| 4,705,411 A | * | 11/1987 | Kellstrom | 384/450 |
| 4,802,775 A | * | 2/1989 | Takata | 384/450 |
| 4,929,098 A | * | 5/1990 | Takata et al. | 384/450 |
| 5,890,815 A | * | 4/1999 | Ijuin et al. | 384/568 |
| 6,227,711 B1 | * | 5/2001 | Kellstrom et al. | 384/450 |
| 6,254,277 B1 | * | 7/2001 | Nagai et al. | 384/450 |

FOREIGN PATENT DOCUMENTS

| | | |
|---|---|---|
| JP | 3-12015 | 2/1991 |
| JP | 5-89943 | 12/1993 |

OTHER PUBLICATIONS

Reusner, H., "The Logarithmic Roller Profile—The Key To Superior Performance of Cylindrical and Taper Roller Bearings", Ball Bearing Journal 230, 1989, pp. 2–10.

Johns, P.M. and Gohar, R., Roller Bearings Under Radial and Eccentric Loads, Tribology international Jun. 1981, vol. 14.

Harris, Tedric A., "Rolling Bearing Analysis", A Wiley-Interscience Publication, 1991, pp. 193–201 & 708–712.

* cited by examiner

Primary Examiner—Thomas R. Hannon
(74) Attorney, Agent, or Firm—Sughrue Mion, PLLC

(57) ABSTRACT

When a crowning is subjected to a roller or on a rolling surface using a combination of two arcs, a crowning profile is specified in such a manner that each crowning quantity at two points where distances x in a bus extending direction from the center line of the roller are respectively situated at positions of 0.425 and 0.5 times an effective contact length $L_e$, are respectively present between the value of a well-known logarithmic crowning when a bearing load P is 0.4 times a basic load rating C and the value of the logarithmic crowning when the bearing load P is 0.6 times the basic load rating C.

17 Claims, 11 Drawing Sheets

ROLLER BEARING

BACKGROUND OF THE INVENTION

1. Field of the Invention

The present invention relates to a roller bearing which uses cylindrical-shaped, conical-shaped or spherical-shaped rollers as its rolling elements.

2. Description of the Related Art

Figure 16:
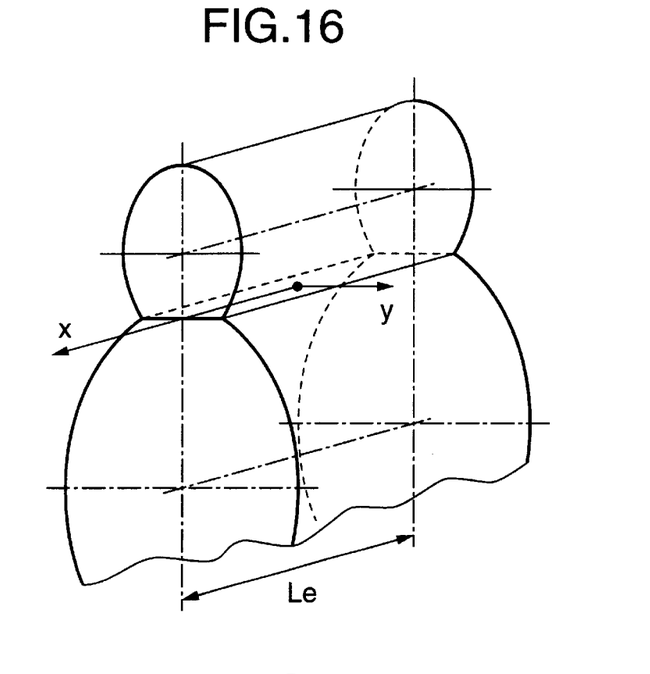
FIG. 16 is an explanatory view of the contact state of a roller.
Figure 17:
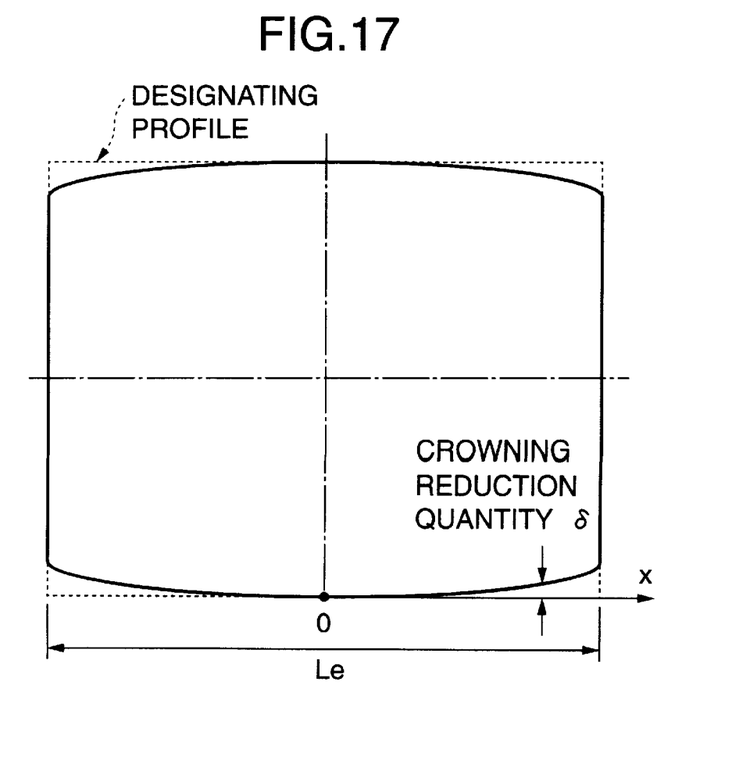
FIG. 17 is an explanatory view of a crowning.

Now, FIG. 16 shows a state of contact between two cylindrical-shaped elements. Conventionally, there are known various kinds of mechanical elements using this state of rolling contact, such as a roller bearing. On the other hand, this state of rolling contact raises a possibility that, in two end portions of the contact portion in an X-axis direction between the two cylindrical-shaped elements, there can be generated an excessively large contact stress, that is, a so-called edge load. It is also known that such edge load gives rise to the shortened lives of the mechanical elements. In view of this, in a roller bearing, as shown in FIG. 17, a rolling element or a rolling surface is subjected to a crowning so as to gradually reduce the contact stress at the two end portions of the contact portion.

The crowning itself is a known technique. For example, as disclosed in Japanese Utility Model Unexamined Publication No. Hei. 05-89943, there is known an invention which relates to a crowning. Also, referring to the profile of the crowning, there is well known a so called logarithmic crowning which can be expressed by the following equation (1) (A paper titled "Roller bearings under radial and eccentric loads" written by P. M. Johns and R. Gohar, published by TRIBOLOGY International, Vol. 14, 1981, pages 131–136).

$$\delta = -\frac{w}{\pi L_e}\left(\frac{1-v_1^2}{E_1} + \frac{1-v_2^2}{E_2}\right) ln\left(1 - \left(1 - 0.3033\frac{2b}{L_e}\right)\left(\frac{2x}{L_e}\right)^2\right) \quad (1)$$

where, $\delta$: sum of crowning quantities of two contact elements (a roller and a raceway surface of an inner race)

w: contact load $L_e$: effective contact length in a bus extending direction between two contact elements $E_1$, $E_2$: Young's modulus of two contact elements (the roller and the inner race)

$v_1$, $v_2$: Poisson's ratios of two contact elements (the roller and the inner race), and b: ½ of Hertz contact width.

In fact, it is difficult to apply this logarithmic crowning. Therefore, there is a crowning technique which, as disclosed in Japanese Utility Model Unexamined Publication No. Hei. 03-12015, uses a combination of two or more arcs. Also there are proposed crowning techniques which are composed of a single arc, and a combination of a straight line and an arcs. Further, there is known a so-called partial crowning technique in which crownings are subjected only onto the two end portions of the contact surface of a roller or a rolling surface.

Figure 18:
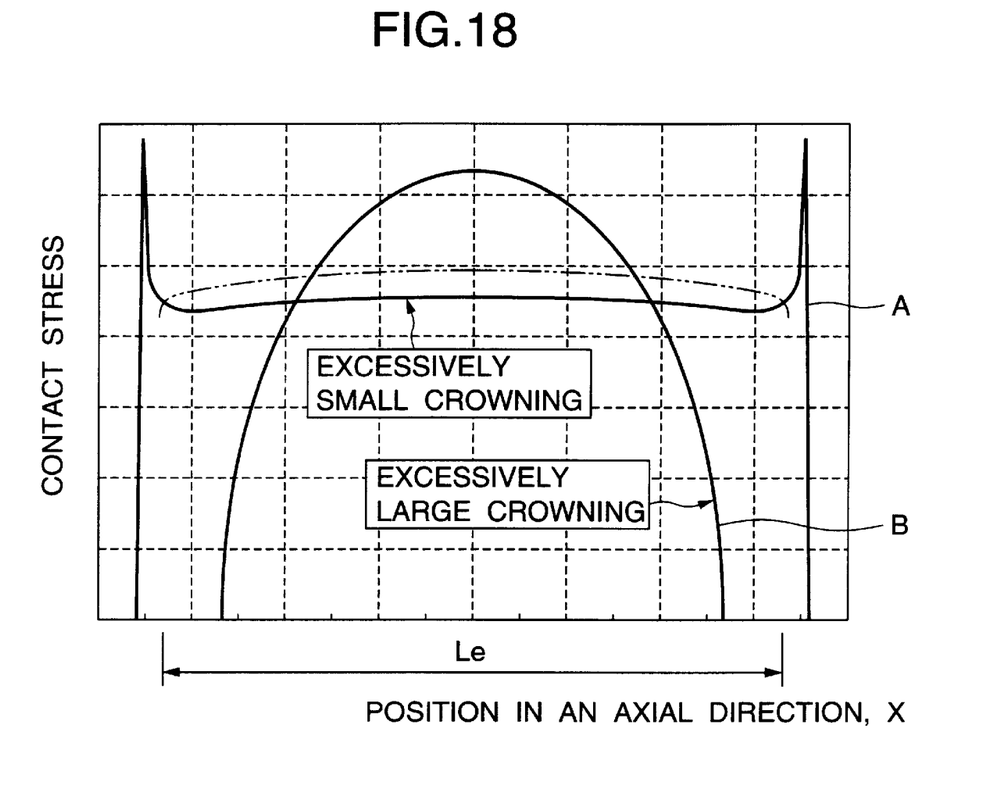
FIG. 18 is an explanatory view of contact stress depending on the shape of a crowning.

According to the above-mentioned crowning techniques, as shown by a two-dot chained line in FIG. 18, preferably, with respect to the effective contact length $L_e$ in the bus extending direction, a contact stress may be large in the central portion of the contact portion and gradually decrease in the two end portions of the contact portion. On the other hand, of course, it is not desirable that there is produced an edge load due to the excessively small crowning as shown by line A in FIG. 18. Further, it is not desirable that in case where the crowning reduction quantity is increased excessively due to the excessively large crowning as shown by line B in FIG. 18, the actual contact length of the bus runs short, which gives rise to the shortened life of the roller bearing.

In the above-mentioned logarithmic crowning according to the equation (1), by assuming a contact load w, the crowning profile can be determined. In case where the assumed contact load w is coincident with a load in an actual operation time, the long life of the roller bearing can be expected. However, in case where the two loads are not coincident with other, the long life cannot be expected. Also, for mechanical elements in practical use, it is rare that a load to be applied to the mechanical elements is constant. Inmost cases, various levels of loads are actually applied to the mechanical elements during operation. Further, in a bearing which is used practically, there is a case where a misalignment can occur when assembling the bearing, that is, the misalignment can occur between a center line of a rolling element and a center line of a raceway of an inner race. In that case, the rolling element and the raceway of the inner race are contacted with each other in an inclined manner. Therefore, even in case where the above-mentioned logarithmic crowning has been subjected to the roller or rolling surface, there is still raised a possibility that an edge load can occur on one side end face of the roller or rolling surface to thereby give rise to the shortened life of the bearing. This shows that the above-mentioned logarithmic crowning according to the equation (1) cannot always attain the extended life of the roller bearing.

On the other hand, in the crowning profiles according to the above-mentioned crowning techniques respectively using a single arc, a combination of two or more arcs, and a combination of a straight line and arcs, there have not yet been made the concrete and clear numerical values that can contribute toward extending the life of the roller bearing.

SUMMARY OF THE INVENTION

The present invention aims at eliminating the above-mentioned drawbacks found in the conventional roller bearing. Accordingly, it is an object of the invention to provide a roller bearing in which the numerical values of crowning profiles respectively according to concrete combinations of arcs and the numerical values of a partial crowning profile can be made clear to thereby be able to extend the life of the roller bearing.

The object can be achieved by a roller bearing which comprises: a first race having a first raceway; a second race having a second raceway; and a rolling element provided rotatably between the first raceway and the second raceway. In the roller bearing, the sum $\delta$ of a crowning quantity of the rolling element and at least a crowning quantity of a first raceway surface of the first raceway, at a first point $X_1$ and a second point $X_2$, wherein the first point $X_1$ is positioned apart from a center of the rolling element or the first raceway in a bus extending direction of a bus of the rolling element by 0.425 $L_e$, and the second point $X_2$ is positioned apart from the center in the bus extending direction by 0.5 $L_e$, where $L_e$ denotes an effective contact length in the bus extending direction between the first raceway surface of the first raceway and the rolling surface of the rolling element, satisfies follow equations (1) and (2):

at the first point $X_1$ $$-\frac{3.264C}{\pi \cdot L_e \cdot E' \cdot Z \cdot \cos\alpha} ln\left(0.2775 + 1.583 \times \sqrt{\frac{R \cdot C}{\pi \cdot E' \cdot L_e^3 \cdot Z \cdot \cos\alpha}}\right) \leq \quad (2\text{-}1)$$

$$\delta \leq -\frac{4.896C}{\pi \cdot L_e \cdot E' \cdot Z \cdot \cos\alpha} ln\left(0.2775 + 1.939 \times \sqrt{\frac{R \cdot C}{\pi \cdot E' \cdot L_e^3 \cdot Z \cdot \cos\alpha}}\right)$$

and, at the second point $X_2$ $$-\frac{3.264C}{\pi \cdot L_e \cdot E' \cdot Z \cdot \cos\alpha} ln\left(2.192 \times \sqrt{\frac{R \cdot C}{\pi \cdot E' \cdot L_e^3 \cdot Z \cdot \cos\alpha}}\right) \leq \quad (2\text{-}2)$$

$$\delta \leq -\frac{4.896C}{\pi \cdot L_e \cdot E' \cdot Z \cdot \cos\alpha} ln\left(2.684 \times \sqrt{\frac{R \cdot C}{\pi \cdot E' \cdot L_e^3 \cdot Z \cdot \cos\alpha}}\right)$$

where,
E': equivalent modulus of elasticity;

$2/E'=(1-v_1^2)/E_1+(1-v_1^2)/E_2$ $E_1$, $E_2$: Young's modulus of the rolling element and the first race,
$v_1$, $v_2$: Poisson's ratios of the rolling element and the first race;
R: equivalent radius $R=r_1 \cdot r_2/(r_1+r_2)$ $r_1$: average of radius of the rolling element or average radius of the rolling element
$r_2$: radius of the first raceway at a contact point with a center of the rolling element;
C: basic load rating;
Z: number of rolling elements;
α: contact angle between the first race and the rolling element.

In the above-mentioned roller bearing of the invention, the reason why the distance from the above-mentioned center is specified to be 0.425 $L_e$ and 0. 5 $L_e$, that is, the first point $X_1$, and the second point $X_2$ are respectively specified to be positioned apart from the center by 0.425 $L_e$, and 0.5 $L_e$ is as follows. That is, although the logarithmic crowning profile theoretically shows the long life of the roller bearing, it is difficult to manufacture such crowning profile. However, the inventors have paid attention to the following fact: that is, in the arc crowning as well, in case where it is set so as to provide a crowning profile approximate to the crowning profile of the logarithmic crowning, the roller bearing can secure a long life. Further, referring to the distance from the center of the roller, the edge load is small around the central portion of the roller but t he edge load increases gradually toward the end portions of the roller. With this characteristic of the edge load taken into account, in a curved line which is obtained by connecting together a plurality of arcs, in case where the crowning reduction quantities at two points on the bus of the roller are specified, a crowning profile can b e defined roughly. As a result of the analysis of the distance, it has been found that, when at the positions where the distances from the center of the roller are 0.425 $L_e$ and 0.5 $L_e$ on the bus of the roller the crowning profile is included within the range of a proper logarithmic crowning profile, the life of the roller bearing can be extended. Here, it is clear that, in a curved line obtained by connecting together a plurality of arcs, in case where gate positions are disposed at two points close to the end portions thereof, the curved line approaches a logarithmic curved line.

Also, on the contact central portion of a rolling surface, there may be formed a straight line portion which has a length 0.5–0.9 times the bus-direction effective contact length of the rolling surface and, on each of the two end portions of the rolling surface, there may be subjected a partial crowning consisting of a curved line portion which has a radius 50–125 times the present effective contact length.

In the above-mentioned roller bearing of the invention, it is preferable that a crowning profile providing the crowning quantity is one of a crowning profile and a partial crowning profile. The crowning profile may be composed of a combination of a plurality of arcs, a single arc or a combination of a straight line and arcs. The partial crowning profile may have a straight portion of a contact portion between the rolling surface of the rolling element and the first raceway surface of the first raceway and arcs at both ends of the contact portion.

Further, in the roller bearing of the invention, it is also preferable that the partial crowning profile satisfying following equations (3) and (4):

$$0.5 \leq Ls/Le \leq 0.9 \quad (3)$$

$$50 \leq R1/Le \leq 125 \quad (4)$$

where Ls=straight line portion length in the bus extending direction of the contact portion between the first raceway surface of the first raceway and the rolling surface of the rolling element; and R1=radius of the arc.

Furthermore, in the roller bearing of the invention, it is further preferable that the partial crowning profile satisfies following equations (5) and (6):

$$0.6 \leq Ls/Le \leq 0.8 \quad (5)$$

$$75 \leq R1/Le \leq 100 \quad (6)$$

where Ls=straight line portion length in the bus extending direction of the contact portion between the first raceway surface of the first race and the rolling surface of the rolling element; and R1=radius of the arc.

The above-mentioned partial crowning profile further has a connecting arc which connects the straight line portion with the arc, the connecting arc satisfying following equation (7):

$$0.2R1 \leq R2 \leq 0.4R1 \quad (7)$$

where R2=radius of the connecting arc.

In the above-mentioned roller bearing of invention, it is further advantageous that the rolling element has one of a cylindrical-shaped rolling surface, a conical-shaped rolling surface, and a spherical-shaped rolling surface.

DETAILED DESCRIPTION OF THE PREFERRED EMBODIMENT

Now, description will be given below of a mode for carrying out the invention with reference to the accompanying drawings.

Figure 1:
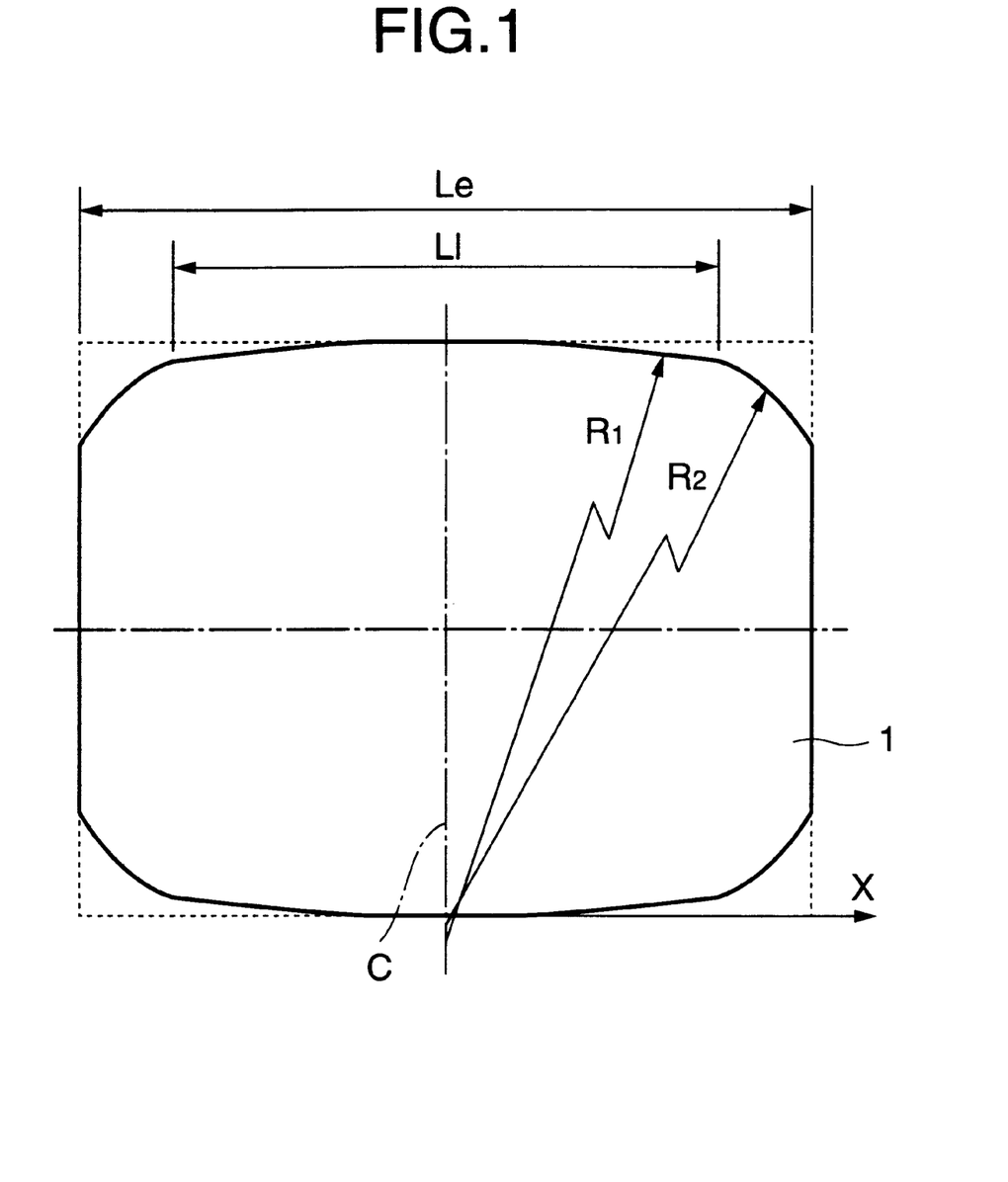
FIG. 1 is a schematic view of a roller of a roller bearing according to a first embodiment of the invention.
Figure 2:
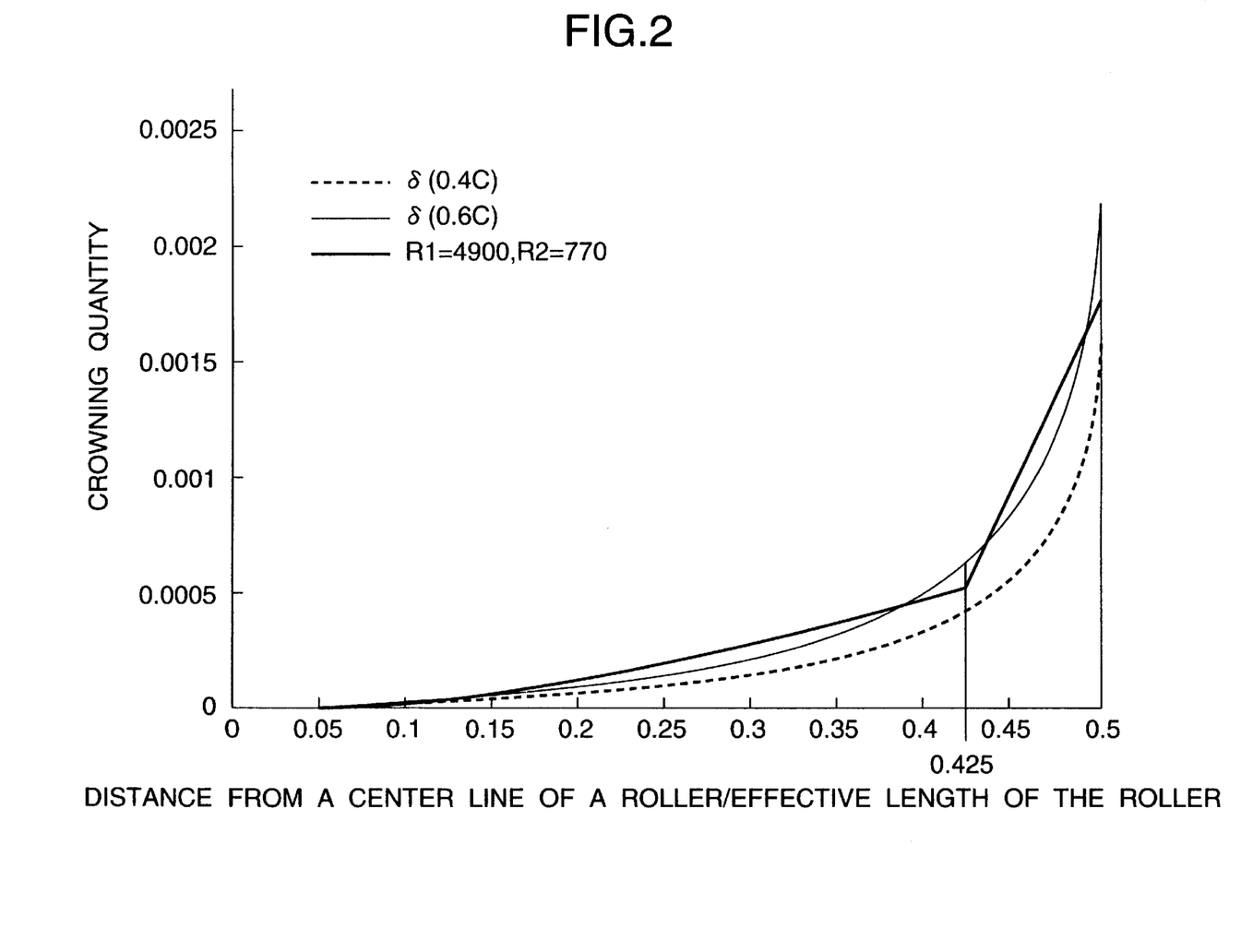
FIG. 2 is an explanatory view of the details of a crowning profile of the roller shown in FIG. 1.

FIG. 1 shows a roller bearing according to a first embodiment of the invention and, in particular, shows the crowning profile of a roller (rolling element) 1. The details of the crowning profile are shown by a heavy solid line. Specifically, the crowning profile consists of a combination of two arcs having different radiuses. That is, the radius (so-called as a radius of curvature) $R_1$ of an arc used in the central portion of a rolling surface is 4900 mm, whereas the radius (so-called as a radius of curvature) $R_2$ of each of two arcs respectively connected to the outside portions of the central-portion arc is 770 mm. Two connecting points between them are set at two positions where a symmetric distance $L_1$ with a center line of the roller as shown by a dotted line C in FIG. 1 is 0.85 times an effective contact length $L_e$ in a bus extending direction of a bus of the roller. That is, the two connecting points are respectively set at positions where a distance x from the center line of the roller is 0.425 times the effective contact length $L_e$. In FIG. 2, of the logarithmic crowning profiles that are obtained according to the above equation (1), a crowning profile, in which a bearing load P is calculated under the assumption that it is 0.4 times a basic load rating C, is shown by a fine solid line. Also, a crowning profile, in which a bearing load P is calculated under the assumption that it is 0.6 times the basic load rating C, is shown by a broken line. The crowning profile of a roller bearing according to the present embodiment is characterized in that a crowning quantity at a first position where the symmetric distance $L_1$ with the center line of the roller is 0.85 times the effective contact length $L_e$, and a crowning quantity at a second position of the end points of the effective contact length $L_e$, are respectively present between the logarithmic crowning having the bearing load P=0.4 C and the logarithmic crowning having the bearing load P=0.6 C. Namely, the crowning quantity at the first position where the distance x from the center line of the roller is 0.425 times the effective contact length $L_e$, and the crowning quantity at the second position where the distance x from the center line of the roller is 0.5 times the effective contact length $L_e$ are present between the logarithmic crowning having the bearing load P=0.4 C and the logarithmic crowning having the bearing load P=0.6 C.

In the above equation (1), the crowning quantity δ can be found from the contact load w and bearing dimension factors depending on the types and sizes of bearings. That is, in case where a bearing to be used is decided, the crowning quantity δ is a function of the contact load w. The contact load can be calculated according to a bearing load, and the number and contact angle of rolling elements. However, generally, the life of a bearing is discussed based on the bearing load P and, therefore, the crowning quantity in the logarithmic crowning is expressed as δ (P). Also, since mostly the bearing load P, as described above, is represented by the ratio of the basic load rating C, the crowning quantity in the logarithmic crowning is also expressed, for example, as δ (0.1 C).

Figure 3:
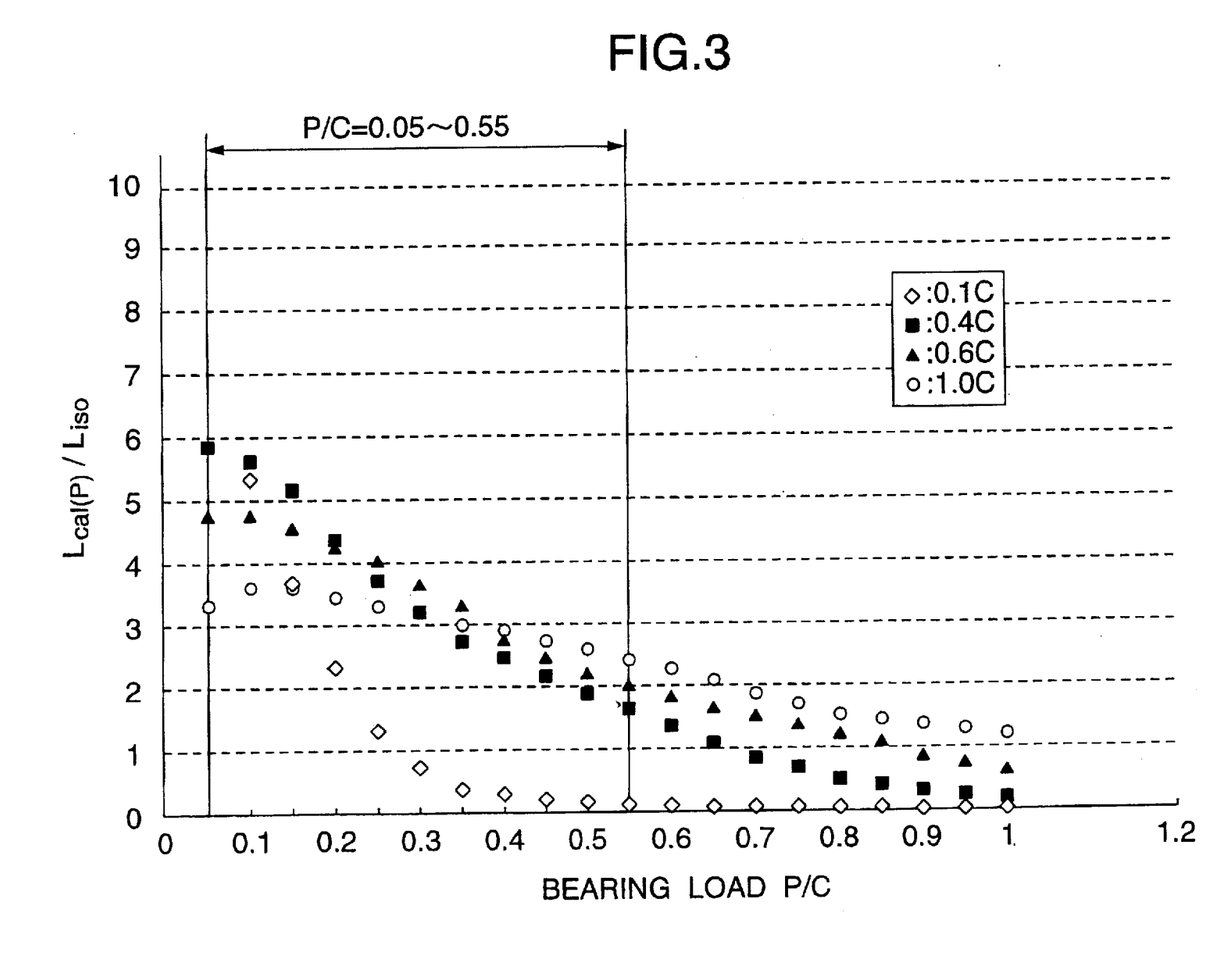
FIG. 3 is an explanatory view of the relation between a bearing load and bearing life when the bearing load ratio is changed.

Next, in a high-load-capacity type cylindrical roller bearing NJ308E, the bearing lives were calculated when the bearing load P was changed in various manners. FIG. 3 shows the relation between the bearing life ratios and the logarithmic crowning δ (0.1 C), δ (0.4 C), δ (0.6 C), δ (1.0 C) when the bearing load P is 0.1 times, 0.4 times, 0.6 times, 1.0 times the basic load rating C. In FIG. 3, $L_{cal(P)}$ expresses the calculated lives with the bearing internal factors taken into account, whereas $L_{ISO}=(C/P)^{10/3}$ stands for the calculated lives which are specified in the ISO standards. Also, in the calculation of a rolling element load distribution within a bearing, we referred to a book titled "Rolling Bearing Analysis" written by T. A. Harris (3rd edition, John Wiley & Sons, 1991), Pages 193–201. In the calculation of the bearing life, we referred to the above book, pages 708–712 and H. Reusner's paper titled "The logarithmic roller profile—the key to superior performance of cylindrical and taper roller bearings" (Ball Bearing Journal 230, 1989, pages 2–10). As can be seen clearly from FIG. 3, in the case of the crowning quantity δ ((0.1 C) in which the bearing load is small, a long bearing life can be obtained in the light load range, whereas the bearing life is shortened in the heavy load range. Also, in the case of the crowning quantity δ ((1.0 C) in which the bearing load is large, the bearing life is extended when compared with the above-mentioned δ ((0.1 C) in the heavy load range, whereas the bearing life is shortened in the light load range.

Next, in order to examine what kinds of crownings can provide a good bearing life characteristic in a wide range of bearing loads, a bearing life evaluation was conducted using an evaluation function shown in the following equation (3).

$$F = \frac{1}{0.5C}\int_{0.05C}^{0.55C}(L_{cal(P)}/L_{ISO})dp \qquad (3)$$

Figure 4:
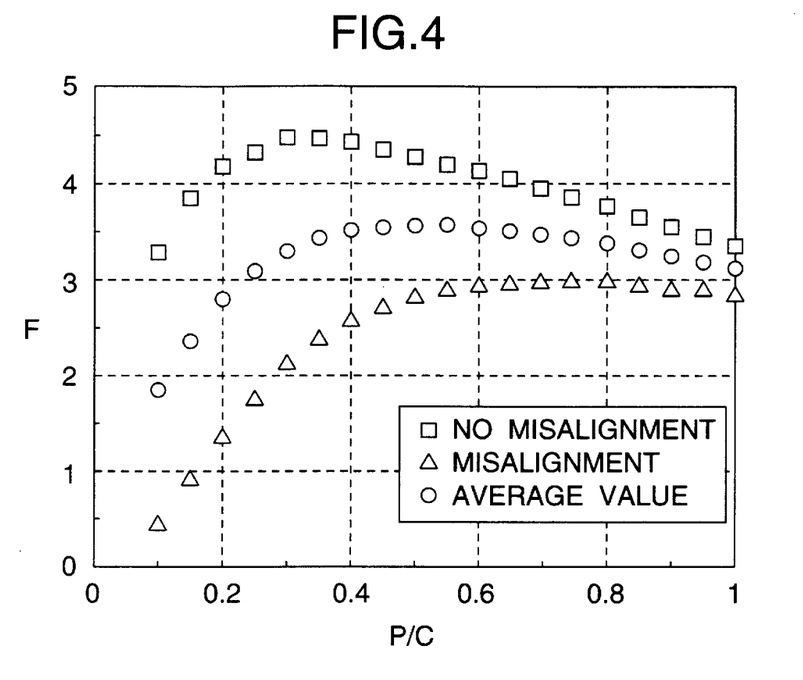
FIG. 4 is an explanatory view of the relation between the bearing load ratio and bearing life.

In the equation (3), F expresses an average life. Referring to a coefficient, that is, 0.5 C, a generally used bearing load range P is of the range of 0.05 C~0.55 C. Thus, 0.5 C is obtained by subtracting 0.55 C from 0.05. Note that in the specification A~B means a range from A to B with both inclusive (for example, in the above-mentioned generally used bearing load range P, the range of 0.05 C~0.55 C means 0.05 C≦P≦0.55 C). The present evaluation function is defined by an area which is provided by giving a width to the average height of such a life ratio $L_{cal(P)}/L_{ISO}$ as shown in FIG. 3 in the bearing load range P=0.05 C~0.55 C. Also, together with the above, calculations were done when a misalignment was present and when no misalignment was present. A misalignment angle used in the calculations is $1.2 \times 10^{-3}$ which is the allowable misalignment that is determined empirically as set forth in bearing catalogs prepared by bearing manufacturers. The results of the calculations are shown in FIG. 4. In FIG. 4, the horizontal axis expresses the load ratio P/C. As can be seen from FIG. 4, in the case of no misalignment, F shows a long life in the load ratio P/C=0.3~0.4; and, when a misalignment is present, F shows a long life in the load ratio P/C=0.6~0.8. However, similarly to the bearing load, it is difficult to foresee the degree of the misalignment. In view of this, when turning our attention to the average value of the two cases, the average life is long in the range of the load ratio P/C=0.4~0.6. Also, when no misalignment is present, or when a misalignment up to an allowable limit is present, it can have an allowable or more long life.

Figure 5:
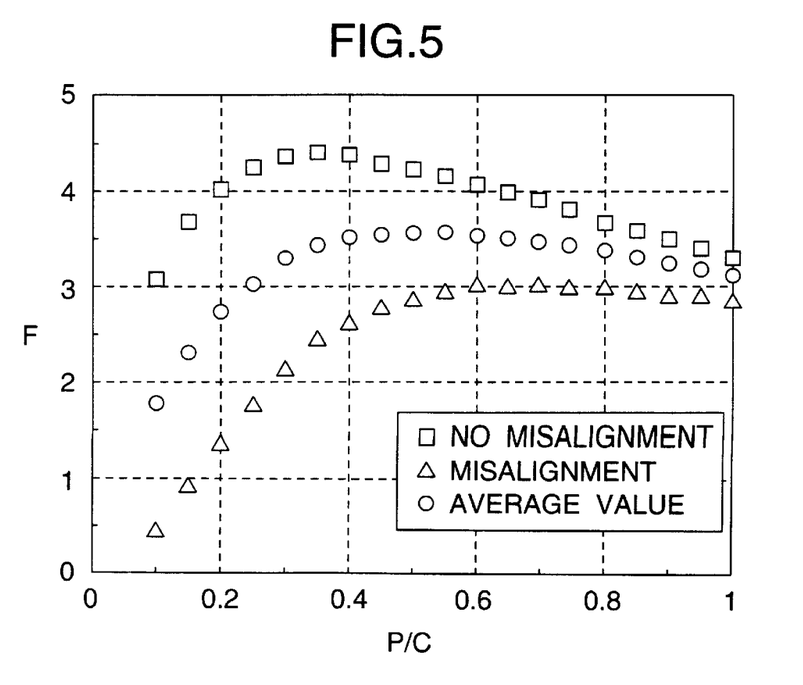
FIG. 5 is an explanatory view of the relation between the bearing load ratio and bearing life.
Figure 6:
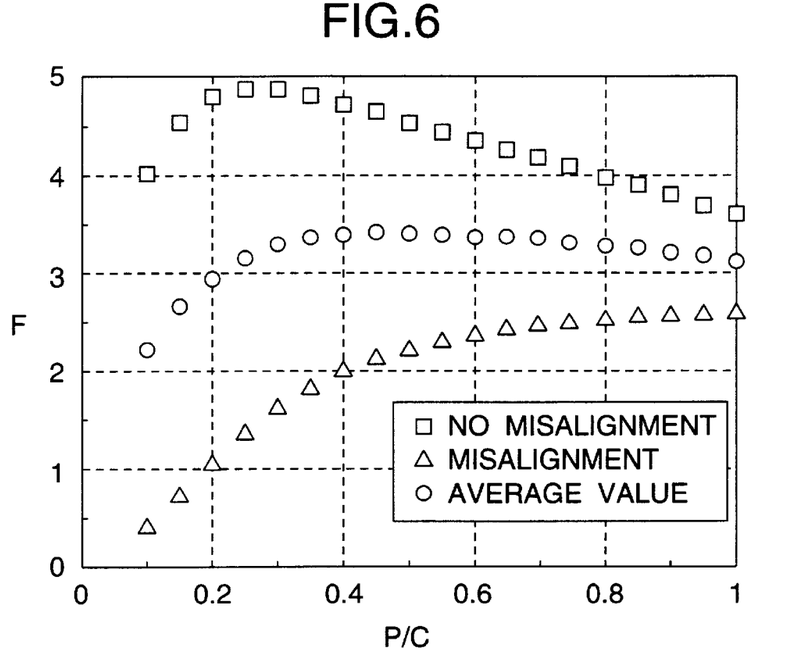
FIG. 6 is an explanatory view of the relation between the bearing load ratio and bearing life.
Figure 7:
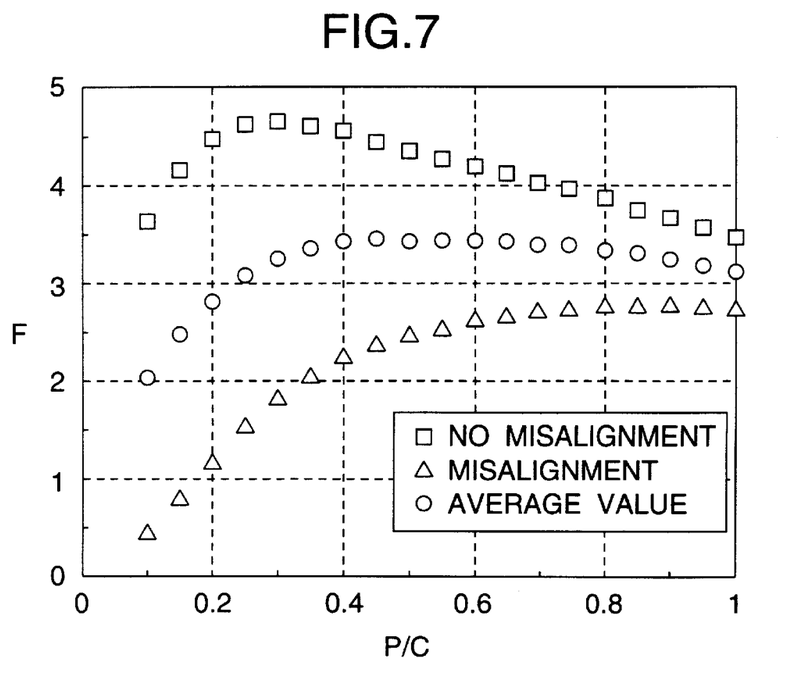
FIG. 7 is an explanatory view of the relation between the bearing load ratio and bearing life.

Further, the bearing average lives of three cases, in which the bearing width is varied, the bearing diameter is varied, and both of the bearing width and diameter are varied, are respectively calculated using a similar evaluation function to the above. The calculation results of these three cases are shown in FIGS. 5 to 7 respectively. Specifically, FIG. 5 shows the average values in two cases where a misalignment is present in NJ208E and where no misalignment is present in NJ208E. FIG. 6 shows the average values in two cases where a misalignment is present in NJ2308E and where no misalignment is present in NJ2308E. FIG. 7 shows the average values in two cases where a misalignment is present in NJ2208E and where no misalignment is present in NJ2208E. In these cases as well, the average lives are long in the range of the load ratio P/C=0.4~0.6. That is, in the logarithmic crowning according to the above equation (1), attention may be directed only to the crowning quantities δ (0.4 C), δ (0.6 C) in the range of the load ratio P/C=0.4~0.6.

Next, as shown in the above-described FIG. 1, in the crowning profile which is obtained by combining together two arcs having different radiuses, under the condition that the distance $L_1$ between the connecting points of the two arcs having different radiuses is 0.85 $L_e$, that is, the distance x from the above-mentioned center line to each of the connecting points is 0.425 $L_e$, analyses were made by changing the radius $R_1$ of the arc in the central portion of the contact portion and the radius $R_2$ of each of the arcs in the two end portions of the contact portion. The bearing lives F were found using the evaluation function according to the above-mentioned equation (3). The analysis results of a high-load-capacity type cylindrical roller bearing NJ308E are shown in Table 1. More specifically, Table 1a shows the bearing average lives F when no misalignment is present, Table 1b shows the bearing average lives F when a misalignment angle is $1.2 \times 10^{-3}$ rad., and Table 1c shows the average values of the above two cases. The underlined numeric values in Table 1c show the most preferred bearing lives. That is, in the range of the above analyses, the radius $R_1$ of the arc in the central portion of the contact portion is 4900 mm or 5600 mm, and the radius $R_2$ of each of the arcs in the two end portions of the contact portion situated outside the central portion is 700 mm or 770 mm. FIG. 1 shows, of these combinations, a combination of $R_1$=4900 mm and $R_2$=770 mm.

TABLE 1a

No misalignment

| R1 | 490 [mm] | 560 | 630 | R2 700 | 770 | 840 | 910 | 980 |
|---|---|---|---|---|---|---|---|---|
| 3500 [mm] | 3.27 | 3.40 | 3.49 | 3.56 | 3.60 | 3.61 | 3.58 | 3.54 |
| 4200 | 3.40 | 3.54 | 3.66 | 3.74 | 3.78 | 3.78 | 3.75 | 3.70 |
| 4900 | 3.47 | 3.64 | 3.77 | 3.86 | 3.90 | 3.89 | 3.86 | 3.81 |
| 5600 | 3.50 | 3.69 | 3.83 | 3.92 | 3.97 | 3.96 | 3.93 | 3.88 |
| 6300 | 3.52 | 3.72 | 3.87 | 3.97 | 4.01 | 4.02 | 3.99 | 3.94 |
| 7000 | 3.51 | 3.72 | 3.89 | 4.00 | 4.04 | 4.05 | 4.02 | 3.97 |
| 7700 | 3.49 | 3.72 | 3.90 | 4.02 | 4.07 | 4.07 | 4.04 | 3.99 |
| 8400 | 3.47 | 3.72 | 3.90 | 4.02 | 4.08 | 4.08 | 4.05 | 4.01 |

TABLE 1b

Misalignment angle of $1.2 \times 10^{-3}$ rad.

| R1 | 490 [mm] | 560 | 630 | R2 700 | 770 | 840 | 910 | 980 |
|---|---|---|---|---|---|---|---|---|
| 3500 [mm] | 2.58 | 2.72 | 2.78 | 2.79 | 2.74 | 2.65 | 2.55 | 2.45 |
| 4200 | 2.52 | 2.67 | 2.74 | 2.74 | 2.69 | 2.61 | 2.51 | 2.40 |
| 4900 | 2.43 | 2.59 | 2.67 | 2.67 | 2.62 | 2.53 | 2.43 | 2.32 |
| 5600 | 2.35 | 2.52 | 2.60 | 2.60 | 2.55 | 2.46 | 2.36 | 2.25 |
| 6300 | 2.28 | 2.46 | 2.54 | 2.53 | 2.48 | 2.39 | 2.28 | 2.18 |
| 7000 | 2.23 | 2.40 | 2.48 | 2.47 | 2.42 | 2.32 | 2.22 | 2.11 |
| 7700 | 2.18 | 2.36 | 2.44 | 2.42 | 2.36 | 2.27 | 2.17 | 2.06 |
| 8400 | 2.14 | 2.32 | 2.40 | 2.38 | 2.32 | 2.22 | 2.12 | 2.01 |

TABLE 1c

Average values

| R1 | 490 [mm] | 560 | 630 | R2 700 | 770 | 840 | 910 | 980 |
|---|---|---|---|---|---|---|---|---|
| 3500 [mm] | 2.93 | 3.06 | 3.14 | 3.17 | 3.17 | 3.13 | 3.07 | 3.00 |
| 4200 | 2.96 | 3.10 | 3.20 | 3.24 | 3.24 | 3.20 | 3.13 | 3.05 |
| 4900 | 2.95 | 3.12 | 3.22 | <u>3.26</u> | <u>3.26</u> | 3.21 | 3.14 | 3.07 |
| 5600 | 2.92 | 3.10 | 3.22 | <u>3.26</u> | <u>3.26</u> | 3.21 | 3.14 | 3.06 |
| 6300 | 2.90 | 3.09 | 3.21 | 3.25 | 3.24 | 3.21 | 3.14 | 3.06 |
| 7000 | 2.87 | 3.06 | 3.19 | 3.24 | 3.23 | 3.19 | 3.12 | 3.04 |
| 7700 | 2.83 | 3.04 | 3.14 | 3.22 | 3.22 | 3.17 | 3.11 | 3.02 |
| 8400 | 2.81 | 3.02 | 3.15 | 3.20 | 3.20 | 3.15 | 3.09 | 3.01 |

The essential requirement, which must be fulfilled by these arc crownings for the preferred bearing life results, is that a crowning quantity at a position where the distance x from the center line of the roller is 0.425 times the effective contact length $L_e$ and a crowning quantity at a position where the distance x from the center line of the roller is 0.5 times the effective contact length $L_e$ are respectively present between a logarithmic crowning having the bearing load P=0.4 C and a logarithmic crowning having the bearing load P=0.6 C. That is, under the other conditions than the condition that $R_1$=4900 mm, 5600 mm and $R_2$=700 mm, 770 mm, the crowning quantities at the above two points are not present between the logarithmic crownings of P=0.4 C and P=0.6 C. In other words, substantially, the distance $L_e$ between the connecting points of the two arcs with different radiuses which constitute the crowning, the radius $R_1$ of the arc in the central portion of the contact portion, and the radius $R_2$ of each of the arcs in the two end portions of the contact portion are not determined, but the profile of the crowning at the above two positions is important. In case where that condition, that is, the bearing load P (which is converted into a contact load w and is then substituted) is substituted in the above equation (1), there can be obtained the above (2-1) and (2-2) equations. Therefore, the crowning profile itself is not limited by the combination of two arcs but the crowning profile may be any one of smooth curved lines, provided that it passes through the above two points (substantially, it may be an arc or a logarithmic curved line)

Figure 8:
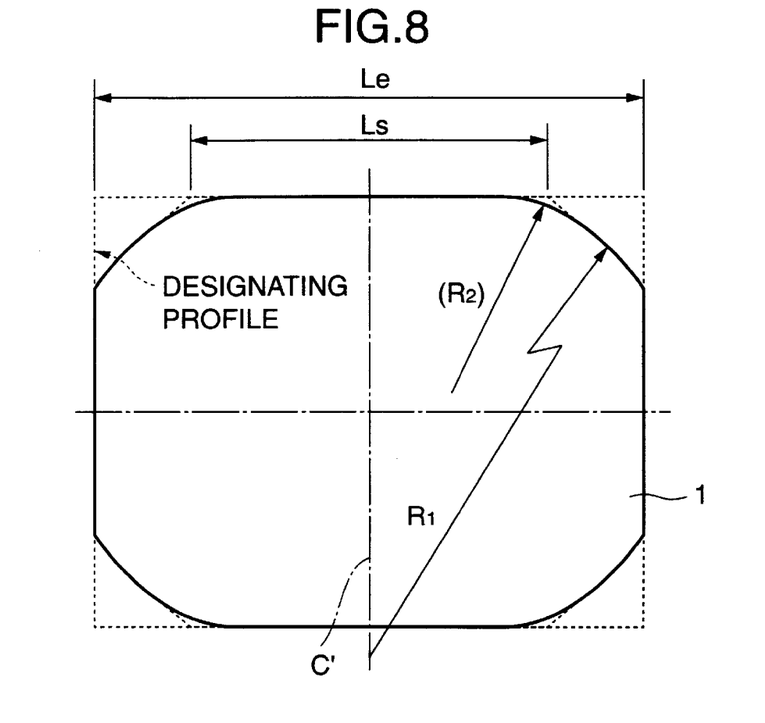
FIG. 8 is a schematic view of a roller of a roller bearing according to a second embodiment of the invention.

Next, description will be given below of a roller bearing according to a second embodiment of the invention. FIG. 8 shows a roller 1 of a roller bearing according to the second embodiment of the invention. The roller 1 has a partial crowning profile. That is, the range of a symmetric distance $L_s$ with a center line of the roller. 1 as shown by a dotted line C' in FIG. 8, is formed in a straight cylindrical portion (straight line portion). On the portions that are situated outside the straight line portion, namely, on each of the two end portions of the contact portion of the roller 1, there is subjected an arc crowning (a curved line portion) having a given radius(so-called as a radius of curvature) $R_1$. In FIG. 8, a radius (so-called as a radius of curvature) $R_2$ is an arc radius which is used to connect together the straight line portion and curved line portion, while the details of the radius $R_2$ will be discussed later. Also, reference character $L_e$ designates an effective contact length in a bus extending direction.

Next, using the evaluation function according to the above-mentioned equation (3), a bearing life evaluation was done while changing the length $L_s$ of the straight line portion and the arc radius $R_1$ of the curved line portion in various manners. In calculation, the above-cited book and paper were also referred to. Also, similarly to the above-mentioned case, the lives of the roller bearing were checked respectively when no misalignment was present and when a misalignment is present (a misalignment angle of $1.2 \times 10^{-3}$ rad.) as well as the average values of the two cases were found. The results of the evaluation calculation are shown in Tables 2a, 2b and 2c, respectively. In the case of no misalignment shown in Table 2a, the maximum bearing life can be obtained when the straight line portion length $L_s$ is equal to 0.8 $L_e$ and the curved line portion arc radius $R_1$ is equal to 75 $L_e$. Also, in the case of the presence of the misalignment shown in Table 2b, the maximum bearing life can be obtained when the straight line portion length $L_s$ is equal to 0.6 $L_e$ and the curved line portion arc radius $R_1$ is equal to $^{75}L_e$. This is because, in the case of no misalignment, by extending the straight line portion, the contact surface stress can be reduced and, in the case of the presence of the misalignment, by shortening the straight line portion and increasing the crowning reduction amount, generation of an edge load can be controlled.

TABLE 2a

Misalignment

| | | $R_1/L_e$ | | | | | | |
|---|---|---|---|---|---|---|---|---|
| | | 50 | 75 | 100 | 125 | 150 | 175 | 200 |
| $L_s/L_e$ | 0.5 | 1.61 | 2.34 | 2.73 | 2.78 | 2.73 | 2.66 | 2.61 |
| | 0.6 | 2.06 | 2.81 | 3.05 | 3.00 | 2.91 | 2.83 | 2.72 |

TABLE 2a-continued

Misalignment

| | | $R_1/L_e$ | | | | | | |
|---|---|---|---|---|---|---|---|---|
| | | 50 | 75 | 100 | 125 | 150 | 175 | 200 |
| | 0.7 | 2.54 | 3.24 | 3.28 | 3.15 | 3.03 | 2.89 | 2.77 |
| | 0.8 | 3.10 | 3.48 | 3.35 | 3.16 | 2.97 | 2.80 | 2.64 |
| | 0.9 | 3.40 | 3.25 | 2.97 | 2.72 | 2.49 | 2.29 | 2.11 |

TABLE 2b

Presence of Misalignment

| | | $R_1/L_e$ | | | | | | |
|---|---|---|---|---|---|---|---|---|
| | | 50 | 75 | 100 | 125 | 150 | 175 | 200 |
| $L_s/L_e$ | 0.5 | 1.46 | 2.00 | 1.95 | 1.71 | 1.45 | 1.22 | 1.00 |
| | 0.6 | 1.72 | 2.14 | 1.92 | 1.60 | 1.31 | 1.05 | 0.83 |
| | 0.7 | 1.95 | 2.07 | 1.70 | 1.33 | 1.02 | 0.77 | 0.58 |
| | 0.8 | 2.03 | 1.69 | 1.23 | 0.86 | 0.60 | 0.42 | 0.31 |
| | 0.9 | 1.37 | 0.83 | 0.49 | 0.30 | 0.20 | 0.15 | 0.11 |

TABLE 2c

Average value

| | | $R_1/L_e$ | | | | | | |
|---|---|---|---|---|---|---|---|---|
| | | 50 | 75 | 100 | 125 | 150 | 175 | 200 |
| $L_s/L_e$ | 0.5 | 1.53 | 2.17 | 2.34 | 2.25 | 2.09 | 1.94 | 1.80 |
| | 0.6 | 1.89 | 2.47 | 2.48 | 2.30 | 2.11 | 1.94 | 1.77 |
| | 0.7 | 2.25 | 2.66 | 2.49 | 2.24 | 2.03 | 1.83 | 1.67 |
| | 0.8 | 2.57 | 2.59 | 2.29 | 2.01 | 1.79 | 1.61 | 1.47 |
| | 0.9 | 2.39 | 2.04 | 1.73 | 1.51 | 1.35 | 1.22 | 1.11 |

Figure 9:
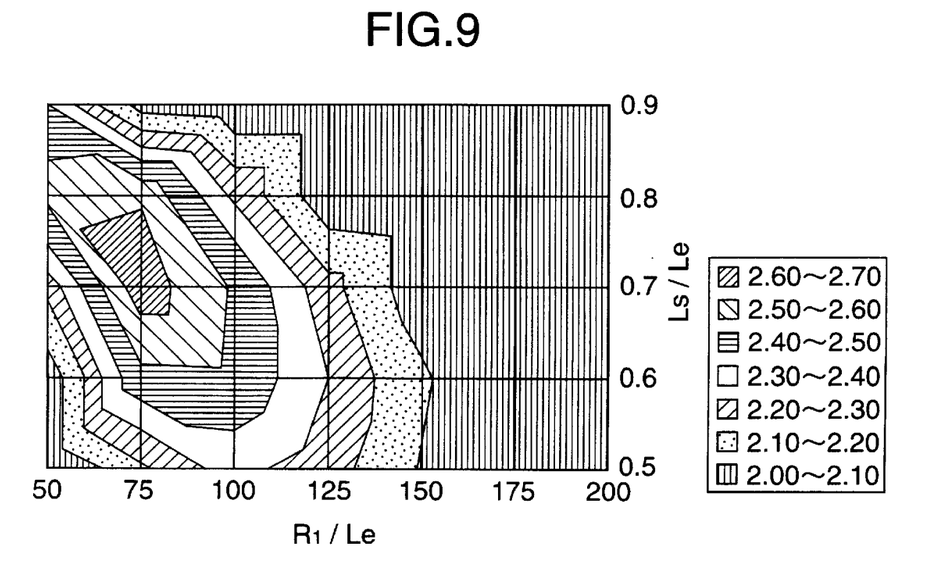
FIG. 9 is an explanatory view of the bearing life of the roller shown in FIG. 8 according to the straight line portion length ratio and curved line portion arc radius ratio.

However, similarly to the above-mentioned case, since it is difficult to foresee the degree of a misalignment as in the bearing load, the average values of the non-misalignment and misalignment cases are used as the evaluation values. In case where the matrices of the length $L_s$ of the straight line portion and the arc radius $R_1$ of the curved line portion are further ramified and the thus ramified values are classified according to the life ranges, there is obtained a graphical representation shown in FIG. 9. FIG. 9 shows that, in the range of the straight line portion length ratio $L_s/L_e=0.5~0.9$, mostly, there can be obtained long lives in the case of the curved line portion arc radius ratio $R_1/L_e=50~125$. More preferably, in the range of the straight line portion length ratio $L_s/L_e=0.6~0.8$ and in the curved line portion arc radius ratio $R_1/L_e=75~100$, there can be obtained long bearing lives regardless of the values of the straight line portion length L hd sand the curved line portion arc radius $R_1$. Also, in this range, whether a misalignment is absent or present, the roller bearing has an allowable or more life.

Figure 10:
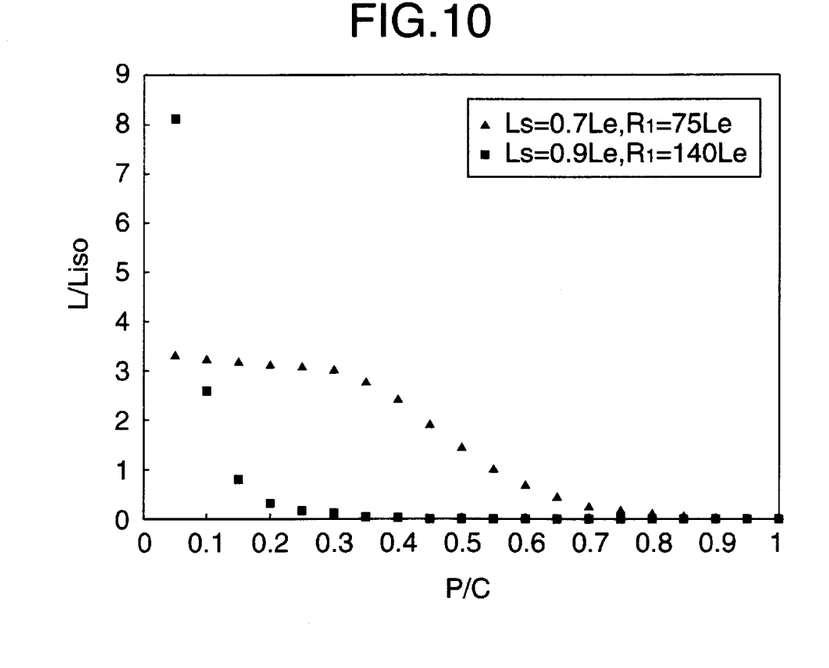
FIG. 10 is an explanatory view of the relation between the bearing load ratio and bearing life when the straight line portion length ratio and curved line portion arc radius ratio are changed.

Next, for evaluation of the life of the roller bearing shown in FIG. 9, there were prepared two roller bearings: that is, one roller bearing having a straight line portion length $L_s=0.7$ $L_e$ and a curved line portion arc radius $R_1=75$ $L_e$; and, the other having a straight line portion length $L_e=0.9$ $L_e$ and a curved line portion arc radius $R_1=140$ $L_e$. And, using these two roller bearings, there is found the relation between the bearing loads and bearing lives, and the analysis results of the relation are shown in FIG. 10. As can be seen clearly from FIG. 10, the latter roller bearing shows a long life when the bearing load is light but the life thereof decreases greatly as the bearing load increases. On the other hand, in the former roller bearing, in the range of the bearing load P up to 0.55 C, the life of the roller bearing does not vary excessively as the bearing load varies but the roller bearing shows a certain degree of long life. That is, in case where the condition, namely, the straight line portion length $L_s=0.5\sim0.9$ $L_e$ and the curved line portion arc radius $R_1=50\sim125$ $L_e$ is satisfied, the bearing life of a given level or more can be secured regardless of the bearing load levels as well as regardless of the presence or absence of a misalignment.

Figure 11:
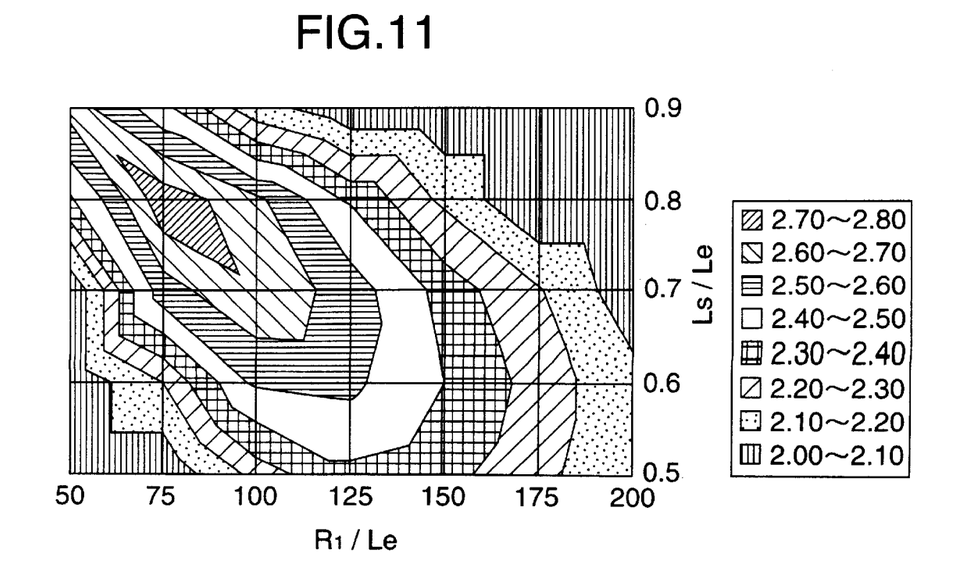
FIG. 11 is an explanatory view of the bearing life according to the straight line portion length ratio and curved line portion arc radius ratio.
Figure 12:
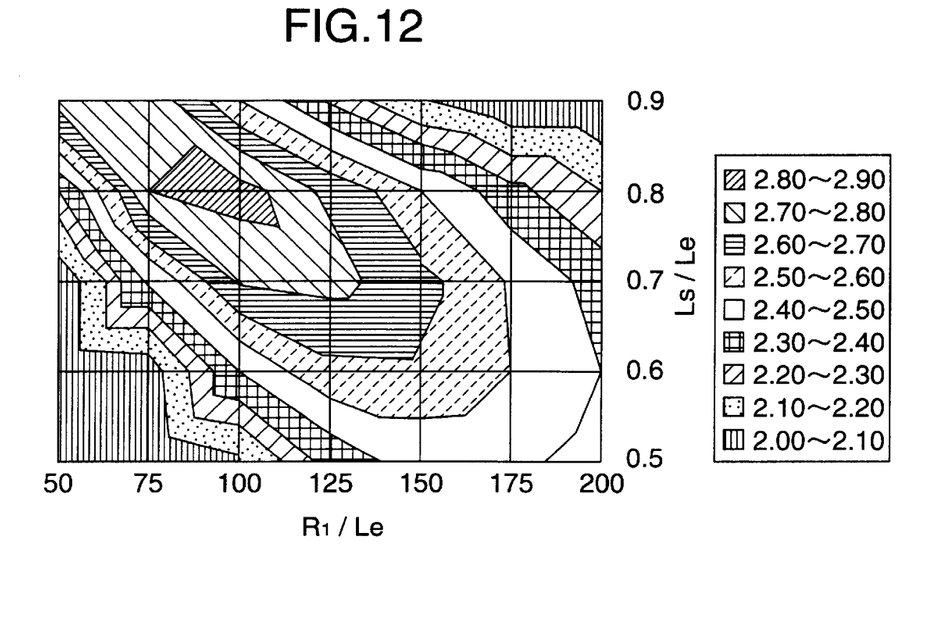
FIG. 12 is an explanatory view of the bearing life according to the straight line portion length ratio and curved line portion arc radius ratio.
Figure 13:
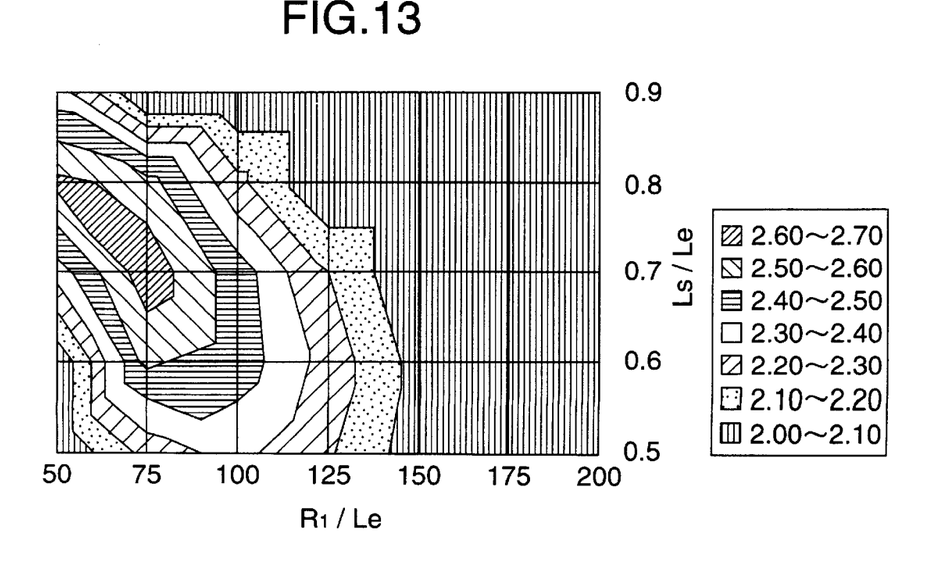
FIG. 13 is an explanatory view of the bearing life according to the straight line portion length ratio and curved line portion arc radius ratio.
Figure 14:
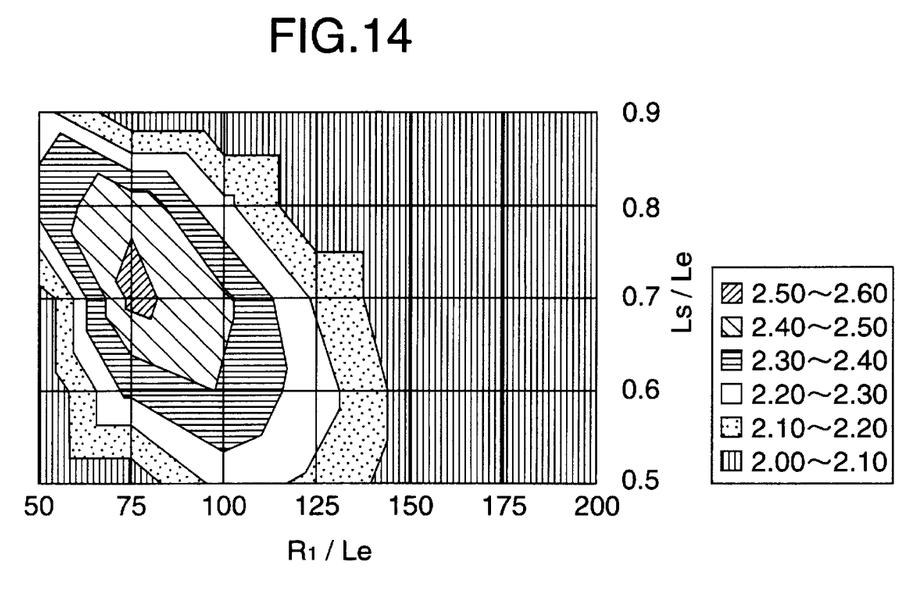
FIG. 14 is an explanatory view of the bearing life according to the straight line portion length ratio and curved line portion arc radius ratio.

Similarly, while changing the widths and diameters of bearings, the lives of the bearings were evaluated similarly to the case shown in FIG. 9. Specifically, FIG. 11 shows the average life values of an NJ2208E bearing respectively obtained in the case of no misalignment and in the case of a misalignment being present. FIG. 12 shows the average life values of an NJ2308E bearing respectively obtained in the case of no misalignment and in the case of a misalignment being present. FIG. 13 shows the average life values of an NJ305E bearing respectively obtained in the case of no misalignment and in the case of a misalignment being present. FIG. 14 shows the average life values of an NJ218E bearing respectively obtained in the case of no misalignment and in the case of a misalignment being present. In these bearings as well, in case where the condition, namely, the straight line portion length $L_s=0.5\sim0.9$ $L_e$ and the curved line portion arc radius $R_1=50\sim125$ $L_e$ is satisfied, the bearing life of a given level or more can be secured.

Figure 15:
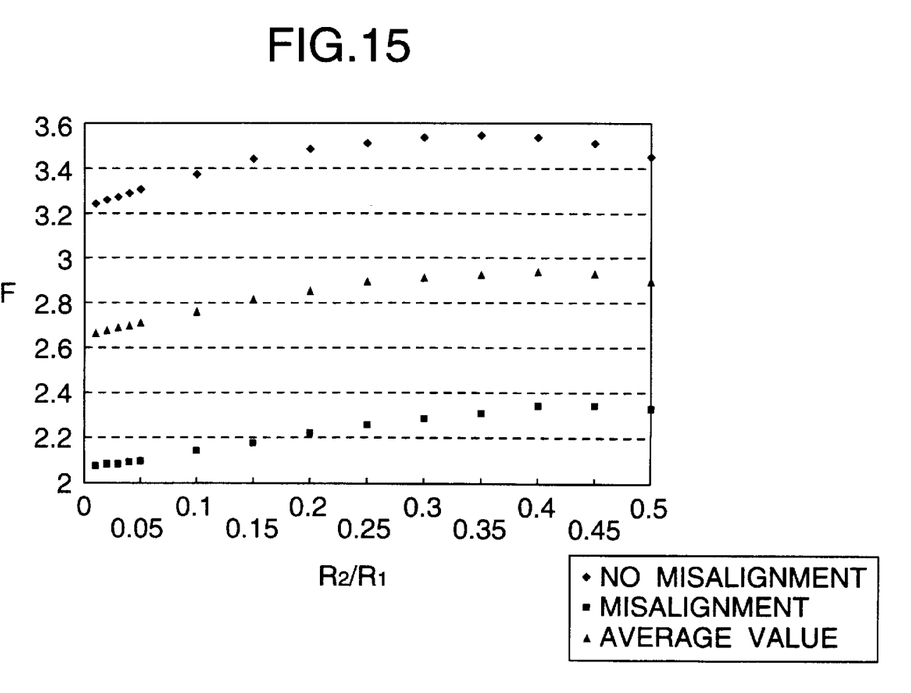
FIG. 15 is an explanatory view of the bearing life when the connecting arc radius is changed.

Next, the inventors examined the influences that are caused when the straight line portion and arc portions are smoothly connected together through individual two arcs each having a radius $R_2$. Here, similarly, in a high-load-capacity type cylindrical roller bearing NJ308E, when the straight line portion length and the curved line portion arc radius were set constant as $L_s=0.7$ $L_e$ and $R_1=75$ $L_e$ respectively, by changing the ratio of the connecting arc radius $R_2$ to the curved line portion arc radius RI variously, the bearing life F in the case of no misalignment, the bearing life F in the case of a misalignment being present (misalignment angle of $1.2 \times 10^{-3}$ rad.), and the average values of these two cases were found by calculation. The results of these calculations are shown in FIG. 15. As can be seen clearly from FIG. 15, as the connecting arc radius $R_2$ increases, the bearing life increases. This is because, when the connecting arc radius $R_2$ is small, surface stresses at the contact points between the straight line portion and curved line portions are high, whereas, as the connecting arc radius $R_2$ increases, the surface stresses decrease.

However, since the connecting arc portions are machined after the straight line portion and curved line portions are machined, it is difficult to control the radius $R_2$ of the connecting arc portions with high precision. In fact, in case where the connecting arc radius $R_2$ is increased excessively, the precision of the roller is degraded. Therefore, preferably, the connecting arc radius $R_2$ may be set in the range of $0.2 \sim 0.4$ $R_1$.

In the respective embodiments that have been described heretofore, description has been given of only the cases where the crownings are subjected to the rollers of the bearings. However, the crownings can also be subjected to the raceway of inner race, or the crownings can also be subjected to both of the rollers and the raceway of inner race.

As has been described hereinbefore, according to the roller bearing of the invention, by specifying part of a crowning profile, the extended life of the roller bearing can be attained in the wide range of loads applied to the roller bearing.

What is claimed is:

1. A roller bearing comprising:

a first race having a first raceway;

a second race having a second raceway; and a rolling element provided rotatably between the first raceway and the second raceway, wherein the sum $\delta$ of a crowning quantity of said rolling element and at least a crowning quantity of a first raceway surface of the first raceway, at a first point $X_1$ and a second point $X_2$, wherein said first point $X_1$ is positioned apart from a center of said rolling element or the first raceway in a bus extending direction of a bus of said rolling element by 0.425 $L_e$, and said second point $X_2$ is positioned apart from the center in the bus extending direction by 0.5 $L_e$, where $L_e$ denotes an effective contact length in the bus extending direction between the first raceway surface of said first raceway and the rolling surface of the rolling element, satisfies follow equations (1) and (2):

at the first point $X_1$ $$-\frac{3.264C}{\pi \cdot L_e \cdot E' \cdot Z \cdot \cos\alpha} ln\left(0.2775 + 1.583 \times \sqrt{\frac{R \cdot C}{\pi \cdot E' \cdot L_e^3 \cdot Z \cdot \cos\alpha}}\right) \leq \delta \leq \quad (1)$$

$$-\frac{4.896C}{\pi \cdot L_e \cdot E' \cdot Z \cdot \cos\alpha} ln\left(0.2775 + 1.939 \times \sqrt{\frac{R \cdot C}{\pi \cdot E' \cdot L_e^3 \cdot Z \cdot \cos\alpha}}\right)$$

and, at the second point $X_2$ $$-\frac{3.264C}{\pi \cdot L_e \cdot E' \cdot Z \cdot \cos\alpha} ln\left(2.192 \times \sqrt{\frac{R \cdot C}{\pi \cdot E' \cdot L_e^3 \cdot Z \cdot \cos\alpha}}\right) \leq \quad (2)$$

$$\delta \leq -\frac{4.896C}{\pi \cdot L_e \cdot E' \cdot Z \cdot \cos\alpha} ln\left(2.684 \times \sqrt{\frac{R \cdot C}{\pi \cdot E' \cdot L_e^3 \cdot Z \cdot \cos\alpha}}\right)$$

where,

E': equivalent modulus of elasticity;

$2/E'=(1-v_1^2)/E_1+(1-v_1^2)/E_2$ $E_1$, $E_2$: Young's modulus of the rolling element and the first race, $v_1$, $v_2$: Poisson's ratios of the rolling element and the first race;

R: equivalent radius $R=r_1 \cdot r_2/(r_1+r_2)$ $r_1$: average of radius of the rolling element or average radius of the rolling element $r_2$: radius of the first raceway at a center point with a center of the rolling element;

C: basic load rating;

Z: number of rolling elements;

$\alpha$: contact angle between the first race and the rolling element.

2. The roller bearing as set forth in claim 1, wherein a crowning profile providing said crowning quantity is one of a crowning profile and a partial crowning profile.

3. The roller bearing as set forth in claim 2, wherein said partial crowning profile has a straight portion of a contact portion between the rolling surface of the rolling element and the first raceway surface of the first race and arcs at both ends of the contact portion, the partial crowning profile satisfying following equations (3) and (4):

$$0.5 \leq Ls/Le \leq 0.9 \tag{3}$$

$$50 \leq R1/Le \leq 125 \tag{4}$$

where Ls=straight line portion length in the bus extending direction of the contact portion between the first raceway surface of the first raceway and the rolling surface of the rolling element; and R1=radius of the arc.

4. The roller bearing as set forth in claim 3, wherein the partial crowning profile further has a connecting arc which connects the straight line portion with the arc, the connecting arc satisfying following equation (7):

$$0.2R1 \leq R2 \leq 0.4R1 \tag{7}$$

where R2=radius of the connecting arc.

5. The roller bearing as set forth in claim 3, wherein said partial crowning profile satisfies following equations (5) and (6):

$$0.6 \leq Ls/Le \leq 0.8 \tag{5}$$

$$75 \leq R1/Le \leq 100 \tag{6}$$

6. The roller bearing as set forth in claim 5, wherein the partial crowning profile further has a connecting arc which connects the straight line portion with the arc, the connecting arc satisfying following equation (7):

$$0.2R1 \leq R2 \leq 0.4R1 \tag{7}$$

where R2=radius of the connecting arc.

7. The roller bearing as set forth in claim 2, wherein the crowning profile is composed of a combination of a plurality of arcs, a single arc or a combination of a straight line and arcs.

8. The roller bearing as set forth in claim 2, wherein the partial crowning profile has a straight portion of a contact portion between the rolling surface of the rolling element and the first raceway surface of the first race and arcs at both ends of the contact portion.

9. The roller bearing as set forth in claim 8, wherein the partial crowning profile satisfies following equations (3) and (4):

$$0.5 \leq Ls/Le \leq 0.9 \tag{3}$$

$$50 \leq R1/Le \leq 125 \tag{4}$$

where Ls=straight line portion length in the bus extending direction of the contact portion between the first raceway surface of the first race and the rolling surface of the rolling element; and R1=radius of the arc.

10. The roller bearing as set forth in claim 9, wherein the partial crowning profile further has a connecting arc which connects the straight line portion with the arc, the connecting arc satisfying following equation (7):

$$0.2R1 \leq R2 \leq 0.4R1 \tag{7}$$

where R2=radius of the connecting arc.

11. The roller bearing as set forth in claim 9, wherein said partial crowning profile satisfies following equations (5) and (6):

$$0.6 \leq Ls/Le \leq 0.8 \tag{5}$$

$$75 \leq R1/Le \leq 100 \tag{6}$$

12. The roller bearing as set forth in claim 11, wherein the partial crowning profile further has a connecting arc which connects the straight line portion with the arc, the connecting arc satisfying following equation (7):

$$0.2R1 \leq R2 \leq 0.4R1 \tag{7}$$

where R2=radius of the connecting arc.

13. The roller bearing as set forth in claim 1, wherein a crowning profile providing said crowning quantity is a partial crowning profile which has a straight portion of a contact portion between the rolling surface of the rolling element and the first raceway surface of the first race and arcs at both ends of the contact portion, the partial crowning profile satisfying following equations (3) and (4):

$$0.5 \leq Ls/Le \leq 0.9 \tag{3}$$

$$50 \leq R1/Le \leq 125 \tag{4}$$

where Ls=straight line portion length in the bus extending direction of the contact portion between the first raceway surface of the first raceway and the rolling surface of the rolling element; and R1=radius of the arc.

14. The roller bearing as set forth in claim 13, wherein the partial crowning profile further has a connecting arc which connects the straight line portion with the arc, the connecting arc satisfying following equation (7):

$$0.2R1 \leq R2 \leq 0.4R1 \tag{7}$$

where R2=radius of the connecting arc.

15. The roller bearing as set forth in claim 13, wherein said partial crowning profile satisfies following equations (5) and (6):

$$0.6 \leq Ls/Le \leq 0.8 \tag{5}$$

$$75 \leq R1/Le \leq 100 \tag{6}$$

16. The roller bearing as set forth in claim 15, wherein the partial crowning profile further has a connecting arc which connects the straight line portion with the arc, the connecting arc satisfying following equation (7):

$$0.2R1 \leq R2 \leq 0.4R1 \tag{7}$$

where R2=radius of the connecting arc.

17. The roller bearing as set forth in claim 1, wherein said rolling element has one of a cylindrical-shaped rolling surface, a conical-shaped rolling surface, and a spherical-shaped rolling surface.

* * * * *